US009203572B2

(12) United States Patent
Desai et al.

(10) Patent No.: US 9,203,572 B2
(45) Date of Patent: Dec. 1, 2015

(54) MANAGING INTERFERENCE BETWEEN COLLOCATED RADIOS

(71) Applicant: Broadcom Corporation, Irvine, CA (US)

(72) Inventors: Prasanna Desai, Elfin Forest, CA (US); Siukai Mak, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 211 days.

(21) Appl. No.: 13/909,984

(22) Filed: Jun. 4, 2013

(65) Prior Publication Data

US 2014/0341108 A1    Nov. 20, 2014

Related U.S. Application Data

(60) Provisional application No. 61/825,484, filed on May 20, 2013.

(51) Int. Cl.
| | |
|---|---|
| *H04W 80/04* | (2009.01) |
| *H04W 88/06* | (2009.01) |
| *H04W 28/04* | (2009.01) |
| *H04W 72/04* | (2009.01) |
| *H04L 5/00* | (2006.01) |
| *H04W 24/02* | (2009.01) |
| *H04L 1/00* | (2006.01) |
| *H04B 1/715* | (2011.01) |
| *H04J 11/00* | (2006.01) |

(52) U.S. Cl.
CPC .............. *H04L 5/0032* (2013.01); *H04B 1/715* (2013.01); *H04J 11/0056* (2013.01); *H04L 1/0017* (2013.01); *H04L 5/0073* (2013.01); *H04W 24/02* (2013.01)

(58) Field of Classification Search
CPC ..... H04W 80/04; H04W 88/06; H04W 28/04; H04W 72/04
USPC ................................................... 370/328, 329
See application file for complete search history.

(56) References Cited

U.S. PATENT DOCUMENTS

| 2005/0083840 | A1* | 4/2005 | Wilson ........................ 370/230 |
| 2008/0045152 | A1* | 2/2008 | Boes ........................... 455/63.1 |
| 2012/0207032 | A1* | 8/2012 | Chen et al. .................... 370/252 |
| 2013/0107867 | A1* | 5/2013 | Li et al. ........................ 370/336 |
| 2013/0344821 | A1* | 12/2013 | Armstrong et al. ............. 455/79 |

OTHER PUBLICATIONS

Blankenbeckler, "An Introduction to Bluetooth", Wireless Developer Network, retrieved from <www.wirelessdevnet.com/channels/bluetooth/features/bluetooth.html> on May 20, 2013, pp. 1-5.
Kasem, et al., "Interference Mitigation Technique for Performance Enhancement in Coexisting Bluetooth and WLAN", 2012 International Conference on Information and Computer Networks (ICICN 2012), pp. 226-232, IPCSIT vol. 27, IACSIT Press, Singapore.
Hodgdon, "Adaptive Frequency Hopping for Reduced Interference Between Bluetooth and Wireless LAN", Design & Reuse, retrieved from <www.design-reuse.com/articles/?id=5715&print=yes>, May 2003, pp. 1-3.

\* cited by examiner

*Primary Examiner* — Ronald B Abelson
(74) *Attorney, Agent, or Firm* — McDermott Will & Emery LLP

(57) ABSTRACT

A device implementing a system for managing interference between collocated radios may include a first radio module, a collocated second radio module, and a host processor. The first radio module may be configured to generate a collocated radio tolerance indicator that indicates a tolerance of the first radio module to interference caused by the collocated second radio module when the collocated second radio module is transmitting, and provide the collocated radio tolerance indicator to a host processor when a second collocated radio module is transmitting. The host processor may be configured to control the second radio module based at least in part on the collocated radio tolerance indicator.

21 Claims, 5 Drawing Sheets

MANAGING INTERFERENCE BETWEEN COLLOCATED RADIOS

CROSS-REFERENCE TO RELATED APPLICATIONS

The present application claims the benefit of U.S. Provisional Patent Application Ser. No. 61/825,484, entitled "Managing Interference Between Collocated Radios," filed on May 20, 2013, which is hereby incorporated by reference in its entirety for all purposes.

TECHNICAL FIELD

The present description relates generally to managing interference, and more particularly, but not exclusively, to managing interference between collocated radios.

BACKGROUND

Wireless devices may include multiple collocated radios that are managed by a host controller and may, in some instances, transmit over neighboring frequencies. For example, a wireless device may include a cellular radio module, such as a Long Term Evolution (LTE) radio module, that can be configured to transmit over, e.g., 2390 MHz, and a Bluetooth and/or Wi-Fi radio module, such as a Bluetooth/Wi-Fi (BT-WLAN) radio module, that can be configured to transmit over, e.g., 2412 MHz. The LTE radio module may generally transmit at a higher power than the BT-WLAN radio module, e.g. to enable longer distance transmissions. Thus, the LTE radio module may interfere with the BT-WLAN radio module when the LTE radio module is transmitting on, e.g., 2390 MHz and the BT-WLAN radio module is transmitting/receiving on, e.g. 2412 MHz. Furthermore, the amount, and/or effect, of the interference may change over the life of the wireless device and/or based on operating parameters of the wireless device, such as the temperature. The interference can be mitigated by the host controller, e.g., by coordinating a change in the frequency of the LTE radio module to a 2G/3G band and/or reducing the transmission power of the LTE radio module. However, these actions may reduce the bandwidth of the cellular transmissions, and therefore it may be desirable to minimize the use of these actions. Furthermore, the 2G/3G band may be overloaded for many network operators, and the network operators may have spent considerable expense in obtaining access to the LTE spectrum. Thus, network operators may wish to minimize any switching from the LTE band to the 2G/3G band.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
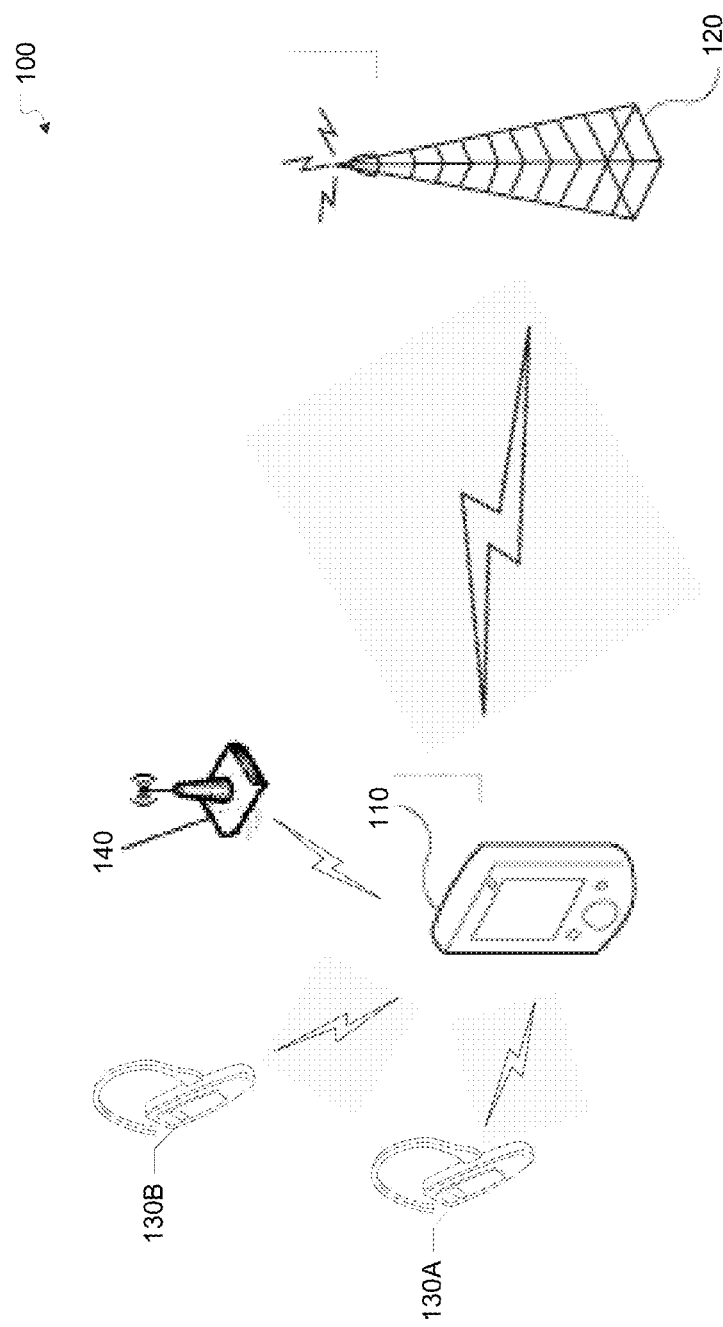
FIG. 1 illustrates an example wireless network environment in which a system for managing interference between collocated radios may be implemented in accordance with one or more implementations.

FIG. 1 illustrates an example network environment 100 in which a system for managing interference between collocated radios may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a user device 110, a base station 120, and electronic devices 130A-B, 140. The user device 110 may include, may be a component of, and/or may be referred to in one or more implementations as, as User Equipment (UE). The user device 110 may include suitable logic, circuitry, interfaces, memory, and/or code that enables communications, e.g. with the base station 120, and/or the electronic devices 130A-B, 140, via wireless interfaces and utilizing one or more radio transceivers. In one or more implementations, the user device 110 may be, or may include, a mobile phone, a personal digital assistant (PDA), a tablet device, a computer, or generally any device that is operable to communicate wirelessly with the base station 120 and/or one or more of the electronic devices 130A-B, 140. In one or more implementations, the user device 110 may be, or may include components of, the systems discussed below with respect to FIGS. 2 and 5.

The base station 120 may include, may be a component of, and/or may be referred to in one or more implementations as, a Node B (NB) or an Evolved NodeB (eNodeB or eNB). The base station 120 may include suitable logic, circuitry, interfaces, memory, and/or code that enables communications, e.g. with the user device 110, via wireless interfaces and utilizing one or more radio transceivers. The base station 120 may be a base station of a cellular-based wireless network, such as an LTE communications network, or generally any cellular-based communications network. In one or more implementations, the base station 120 may be, or may include components of, the system discussed below with respect to FIG. 5.

The electronic devices 130A-B are illustrated in FIG. 1 as Bluetooth devices, such as Bluetooth headsets, and the electronic device 140 is illustrated in FIG. 1 as a wireless access device, such as a Wi-Fi access point. Although the electronic devices 130A-B, 140 are illustrated as Bluetooth and Wi-Fi devices, the electronic devices 130A-B, 140 are not limited to devices that communicate via Bluetooth and/or Wi-Fi communications. In one or more implementations, the electronic devices 130A-B and/or the electronic device 140 may include cellular communication capabilities, e.g. the electronic devices 130A-B, 140 may be LTE capable devices. The electronic devices 130A-B, 140 may be any device that is capable of communicating with the user device 110 and/or the base station 120 using any wireless communication specification or standard.

In one or more implementations, the user device 110 may communicate with the base station 120 according to a first communications specification or standard (e.g., a first type of wireless communication that uses a first frequency band), the user device 110 may communicate with the electronic devices 130A-B, in parallel or individually, according to a second communications specification or standard (e.g., a second type of wireless communication that uses a second frequency band), and the user device 110 may communicate with the electronic device 140 according to a third communications specification or standard (e.g., a third type of wireless communication that uses a third frequency band). The user device 110 may include collocated radio modules for enabling communication using the different communication specifications or standards. For example, the user device 110 may include a cellular radio module that enables cellular communications, such as LTE communications, with the base station 120, a Bluetooth radio module that enables Bluetooth communications with the electronic devices 130A-B, and a Wi-Fi radio module that enables Wi-Fi communications with the electronic device 140. In one or more implementations, multiple modules may be combined into a single module, e.g. the Bluetooth and Wi-Fi radio modules may be combined into a Bluetooth/Wi-Fi radio module.

In one or more implementations, concurrent communications by the user device 110 in accordance with the first, second and/or third communications specifications may interfere with each other, such as when the concurrent communications are over neighboring frequencies. The interference between the concurrent communications may lead to packet loss and/or to the user device 110 becoming disassociated with the base station 120, the electronic devices 130A-B, and/or the electronic device 140. For example, the user device 110 may communicate with the base station 120 using LTE frequency band 40, e.g. 2390 megahertz (MHz), while communicating with the electronic device 140 over Wi-Fi channel 1, e.g. 2412 MHz. Since the user device 110 is concurrently communicating with the base station 120 and the electronic device 140 over neighboring frequencies, the communications may interfere with one another. Thus, the user device 110 may implement a system for managing the interference between the communications on the neighboring frequencies, as is discussed further below with respect to FIGS. 2-4.

Figure 2:
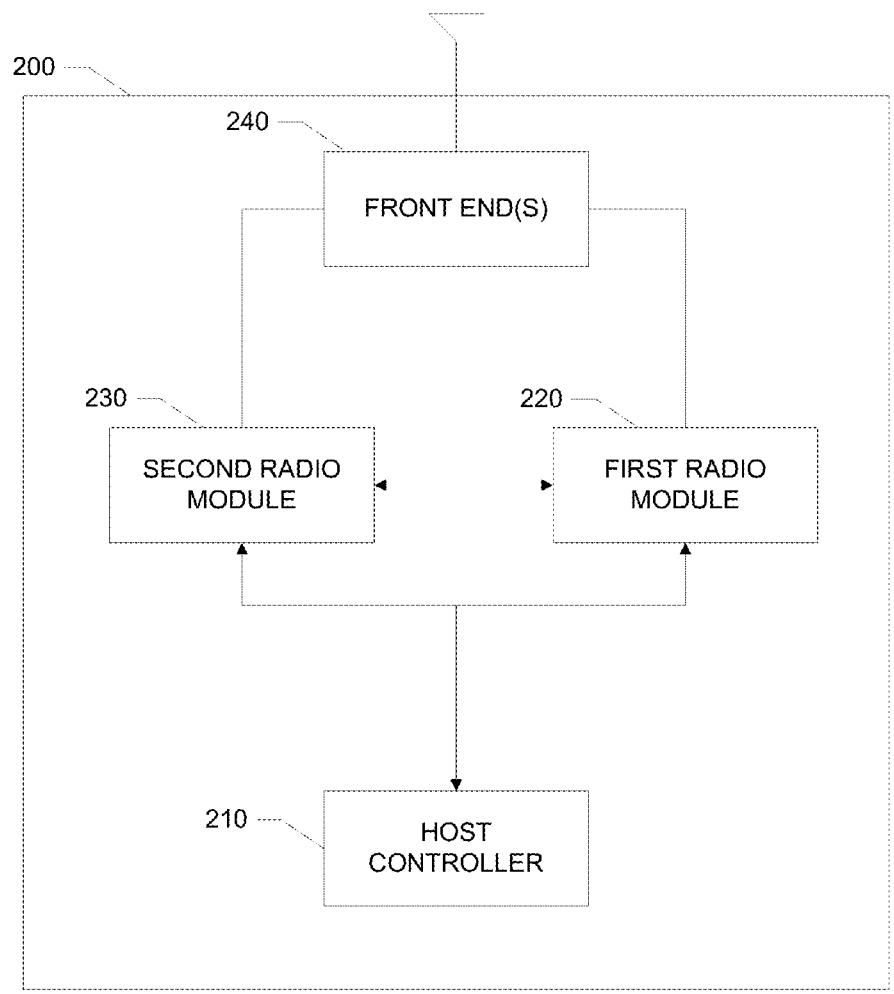
FIG. 2 illustrates an example wireless communication device that may implement a system for managing interference between collocated radios in accordance with one or more implementations.

FIG. 2 illustrates an example wireless communication device 200 that may implement a system for managing interference between collocated radios in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In one or more implementations, the wireless communication device 200 may be the user device 110 of FIG. 1. The wireless communication device 200 may include a host controller 210, or host processor, a first radio module 220, a second radio module 230, and one or more front ends 240. The front ends 240 may include radio frequency (RF) front end circuitry that supports wireless communications between the wireless communication device 200 and the electronic devices 130A-B, the electronic device 140, and the base station 120. For example, the front ends 240 may include antennas, mixers, and/or duplexers. The front ends 240 may also include filtering circuitry (e.g., band pass, band stop, and cellular blocking filters) and amplifiers to support wireless communications. In one or more implementations, the front ends 240 may include elements that are respective to the communications standards or specifications supported by the wireless communication device 200, e.g. LTE, Bluetooth, Wi-Fi, etc.

The host controller 210 may coordinate the overall operations of the wireless communication device 200, including the operations of the first radio module 220, and the second radio module 230. The host controller 210 may also control or coordinate other components of the wireless communication device 200 such as a display, a speaker, a microphone, a camera, or generally any other component of the wireless communication device 200. In one or more implementations, the host controller 210 may include an integrated processor chip having access to a memory device.

The host controller 210 may be coupled to the first radio module 220 and the second radio module 230 via input/output interfaces, such as a bus. The host controller 210 may receive messages from the first radio module 220 and the second radio module 230, and the host controller 210 may transmit messages and/or commands to the first radio module 220 and the second radio module 230. The host controller 210 may be configured to manage the first and second radio modules 220, 230 in order to mitigate interference between the first and second radio modules 220, 230. For example, the host controller may be configured to coordinate a change in the frequencies utilized by the first and/or second radio modules 220, 230.

The first radio module 220 may support communication in accordance with a first communication specification, such as Bluetooth and/or Wi-Fi. For example, the first radio module 220 may enable the wireless communication device 200 to communicate with, e.g. the electronic devices 130A-B over Bluetooth and/or the electronic device 140 over Wi-Fi. The first radio module 220 may include one or more integrated processor chips that include and/or have access to a memory device. In one or more implementations, the first radio module 220 may include an Application Specific Integrated Circuit ("ASIC") adapted for communications according to a communications standard or specification, such as Bluetooth and/or Wi-Fi.

The first radio module 220 may utilize an adaptive frequency-hopping spread spectrum to switch among multiple frequency channels, such as 79 channels for the Bluetooth specification. The first radio module 220 may rapidly switch between frequencies using a pseudorandom sequence that is known to the first radio module 220 and the electronic device to which the first radio module 220 is communicating, such as the electronic devices 130A-B. The first radio module 220 may measure the interference on the channels and may utilize a subset of the channels for frequency hopping (e.g., as listed in an adaptive frequency hopping (AFH) map) that provide the best performance, e.g. the least interference. The interference measured on the channels may be a result of transmissions of a collocated radio, such as the second radio module 230, and/or a result of transmissions of non-collocated radios, such as transmissions associated with a proximate WiFi network. In one or more implementations, the communication specification supported by first radio module 220, e.g. Bluetooth, may require a minimum number of frequency hopping channels to maintain a connection, such as 20 channels.

In one or more implementations, the first radio module 220 may support multiple concurrent connections, or links, with the electronic devices 130A-B, such as over Bluetooth. For example, the first radio module 220 may support a first link with the electronic device 130A and a second concurrent link with the electronic device 130B. The links between the first radio module 220 and the electronic devices 130A-B may be collectively referred to as a piconet. In one or more implementations, the first radio module 220 may be referred to as the 'master' device in the piconet and the electronic devices 130A-B may be referred to as the 'slave' devices in the piconet.

The second radio module 230 may support communication in accordance with a second communication specification, such as LTE. For example, the second radio module 230 may enable the wireless communication device 200 to communicate with, e.g. the base station 120. The second radio module 230 may include one or more integrated processor chips that include and/or have access to a memory device. In one or more implementations, the second radio module 230 may include an Application Specific Integrated Circuit ("ASIC") adapted for communications according to a communications standard or specification, such as LTE. The second radio module 230 may transmit a first signal to the first radio module 220 when the second radio module 230 is actively transmitting, and the second radio module 230 may transmit a second signal to the first radio module 220 when the second radio module 230 is actively receiving. In one or more implementations, the communication of the first and second signals from the second radio module 230 to the first radio module 220 may be facilitated by a direct connection between general purpose pins on the second radio module 230 and the first radio module 220.

In operation, the first radio module 220 may be configured to determine separate signal quality metrics for the channels of each active link of the first radio module 220. In one or more implementations, each active link may only utilize a single channel, e.g. when the first radio module 220 is supporting a communication specification that utilizes a single channel per link, such as the Wi-Fi specification. The signal quality metrics may include received signal strength indication (RSSI), packet error rate (PER), bit error rate (BER), amount of retransmission requests, or generally any metric that may be indicative of signal quality.

The first radio module 220 may further be configured to determine a link margin for each channel of each link, e.g. based on the RSSI values determined for the channels of each link. For example, the first radio module 220 may determine the link margin as the amount that the RSSI value determined for the channel exceeds the receiver sensitivity. In one or more implementations, the receiver sensitivity may be the minimum magnitude of the received signal that can be acceptably demodulated and/or decoded by the first radio module 220, such as a signal strength of at least −70 dBm for a Class I Bluetooth radio module, and at least −80 dBm for Class II Bluetooth radio modules. Thus, the link margin may normalize the RSSI values based on the capabilities and/or characteristics of the first radio module 220 and/or the wireless communication device 200.

The first radio module 220 may determine the signal quality metrics for each channel of each link both when the second radio module 230 is transmitting and, separately, when the second radio module 230 is not transmitting. The first radio module 220 may compare the signal quality metrics determined for each channel of each link to determine the interference being caused by the transmitting of the second radio module 230. For example, the difference, or variation, between the link margins determined for a channel of a link may indicate the impact of the interference being caused by the transmitting of the second radio module 230.

The first radio module 220 may also determine, based on the quality of service associated with each link, whether the link can tolerate the interference being caused by the second radio module 230, in addition to any interference being caused by non-collocated radios. For example, if the quality of service associated with the link is low, such as file upload/download, the link may be able to tolerate a greater amount of interference, e.g. through higher code rates and/or retransmission requests, than links that are associated with a high quality of service, such as human interface device (HID) links. If the first radio module 220 determines that a link cannot tolerate the interference on a particular channel, the first radio module 220 may determine whether another channel can be utilized for the link, or whether the channel can be avoided for the link while still maintaining the minimum number of channels required by the communication specification supported by the first radio module 220.

The first radio module 220 then generates a collocated radio tolerance indicator based at least in part on the link margins and link margin variations determined for the channels of each link, the quality of service associated with each link, and/or whether any channels with substantial interference from the second radio module 230 can be avoided while maintaining a minimum number of required channels, e.g. whether the first radio module 220 can adequately mitigate the interference caused by the second radio module 230. Thus, the collocated radio tolerance indicator indicates the extent that the first radio module 220 can tolerate the interference from the second radio module 230. The first radio module 220 may transmit the collocated radio tolerance indicator to the host controller 210 when the second radio module 230 is determined to be transmitting.

In one or more implementations, if the first radio module 220 utilizes a minimum number of channels to perform frequency hopping, such as 20 out of 79 channels for the Bluetooth specification, the first radio module 220 may weight the collocated radio tolerance indicator based at least in part on the number of channels the first radio module 220 is able to hop over, e.g. in the presence of interference from the collocated second radio module 230 and/or any interference from non-collocated radio modules. For example, a low weight may be used when there are a high number of the 79 channels available for frequency hopping, such as 60 channels. However, a high weight may be used when there are a low number of the 79 channels available for frequency hopping (with 20 channels being the minimum number of channels required), such as 30 channels. In this manner, as the number of available channels for frequency hopping approaches the minimum number of channels, such as 20, and the first radio module 220 becomes less able to tolerate the interference from the collocated second radio module 230 and/or interference from any non-collocated radio modules, the higher the weight and the higher the urgency for the host controller 210 to perform an action to mitigate the interference. Since the first radio module 220 is continuously making the channel measurements and updating the AFH map, the first radio module 220 may be better suited than the host controller 210 for determining whether the transmissions of the second radio module 230 can be tolerated by the first radio module 220.

In one or more implementations, the collocated radio tolerance indicator may be mapped to an action that may be performed by the host controller 210 to mitigate the interference being caused by the second radio module 230 to the first radio module 220. In one or more implementations, the actions may include: coordinating a circuit switched fall back by the second radio module 230, e.g. from LTE to 2G/3G, coordinating a change in channels of the second radio module 230, coordinating a reduction in the transmission power of the second radio module 230, and/or enabling a time division multiplexing coexistence algorithm for transmissions of the first radio module 220 and the second radio module 230. The host controller 210 may perform the action that is mapped to the received collocated radio tolerance indicator. In one or more implementations, the host controller 210 may determine, based on the collocated radio tolerance indicator received from the first radio module 220 and/or information received from the second radio module 230, whether to perform the action that is mapped to the collocated radio tolerance indicator. Alternatively, or in addition to, the collocated radio tolerance indicator may indicate the quality of the one or more links of the first radio module 220 while the collocated second radio module 230 is transmitting, and the host controller 210 may determine an appropriate action based on the indicated quality of the one or more links of the first radio module 220.

In one or more implementations, the first radio module 220 may transmit the collocated radio tolerance indicator to the host controller 210 when the second radio module 230 is transmitting, irrespective of whether the first radio module 220 can tolerate the interference being caused by the second radio module 230. However, if the first radio module 220 can tolerate the interference being caused by the second radio module 230, the collocated radio tolerance indicator may indicate an amount of additional interference that can be tolerated by the first radio module 220, such as based on the link margins of the channels. The collocated radio tolerance indicator may further be mapped to actions that may be performed by the host controller 210 when the first radio module 220 can tolerate additional interference from the second radio module 230, such as increasing the transmission power of the second radio module 230, or coordinating a change in the frequency of the second radio module 230 to a frequency that is closer to the frequencies used by the first radio module 220, e.g. such that the second radio module 230 can avoid some other source of interference.

Since the host controller 210 determines whether to perform an action that may be detrimental to the second radio module 230, e.g. by reducing bandwidth, based on the collocated radio tolerance indicator, rather than based on raw signal quality metrics, the host controller 210 may only perform actions that may be detrimental to the second radio module 230 when the first radio module 220 can no longer tolerate the interference being caused by the second radio module 230, rather than any time that the second radio module 230 is interfering with the first radio module 220. In other words, if the host controller 210 performed a circuit switched fall back any time that the raw signal quality metrics indicated that the second radio module 230 was interfering with the first radio module 220, and irrespective of whether the first radio module 220 could tolerate the interference, the second radio module 230 may be unnecessarily switched to a less desirable state, such as a lower bandwidth frequency.

Figure 3:
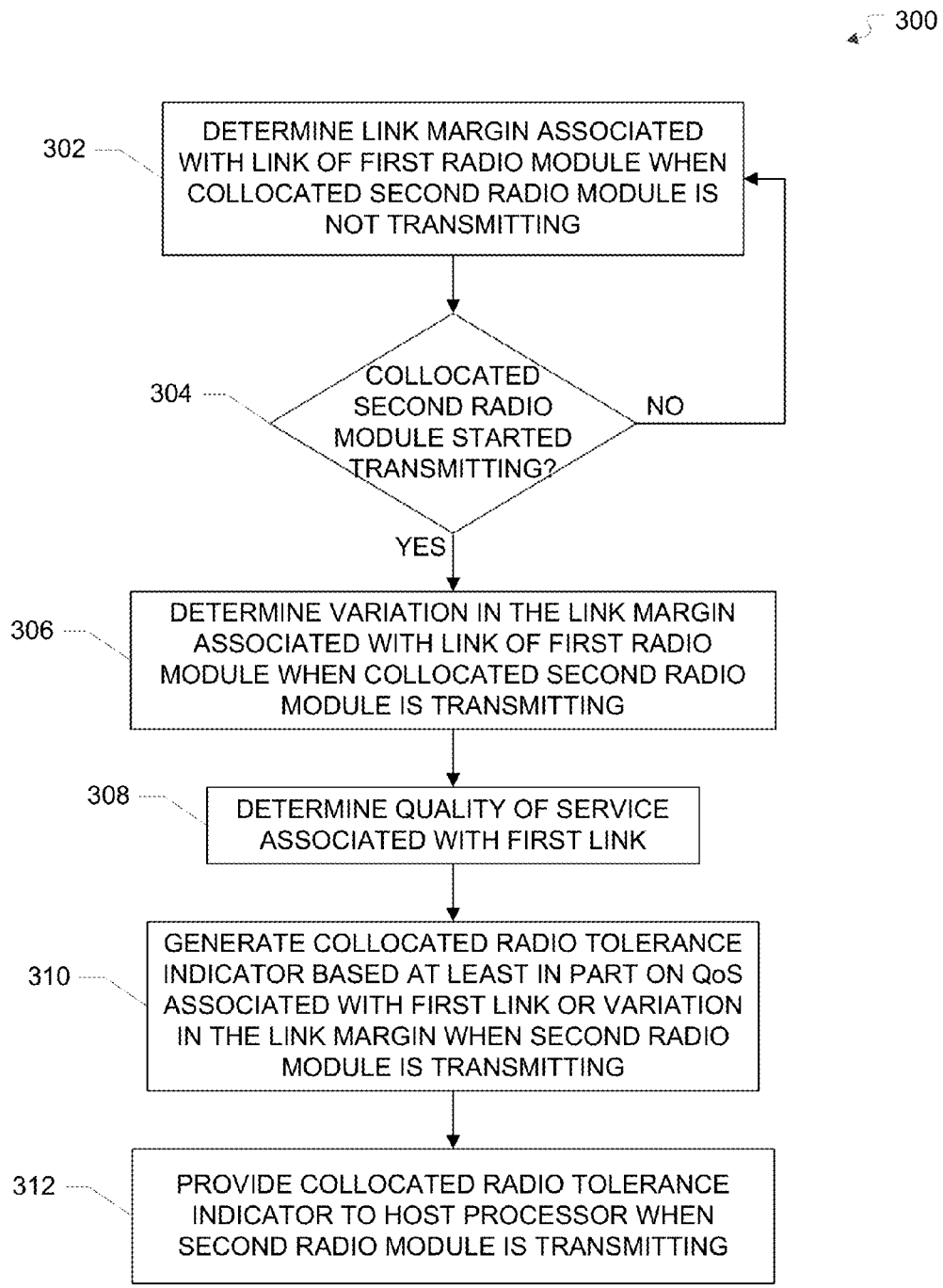
FIG. 3 illustrates a flow diagram of an example process of a radio module in a system for managing interference between collocated radios in accordance with one or more implementations.

FIG. 3 illustrates a flow diagram of an example process 300 of a radio module in a system for managing interference between collocated radios in accordance with one or more implementations. For explanatory purposes, example process 300 is described herein with reference to the first radio module 220 of the wireless communication device 200 of FIG. 2; however, example process 300 is not limited to the first radio module 220 of the wireless communication device 200 of FIG. 2, and the example process 300 may be performed by one or more components of the first radio module 220, such as an integrated processor. Further for explanatory purposes, the blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed.

The first radio module 220 determines one or more link margins associated with a first link over which data is being received when a collocated second radio module 230 is not transmitting (302). For example, if the first link utilizes multiple channels, such as for Bluetooth communication, the first radio module 220 may determine separate link margins for each channel of the first link, and if the first link utilizes a single channel, such as for Wi-Fi communications, the first radio module 220 may determine a single link margin for the channel of the link. In one or more implementations, the first radio module 220 may determine the one or more link margins based on the amount that the RSSI of each channel utilized by the first link exceeds the receiver sensitivity. The receiver sensitivity value, e.g. in dBms, or the decibels (dB) of the measured power referenced to one milliwatt (mW), may be stored in a memory that is accessible by the first radio module 220 and/or the first radio module 220 may periodically conduct a self-test to determine the receiver sensitivity to account for fluctuations over time. In one or more implementations, the first radio module 220 may determine the one or more link margins when data is being received over the link, when data is being transmitted over the link, and/or when the first radio module 220 is idle for the link, e.g. data is not being received or transmitted over the link.

The first radio module 220 determines whether the collocated second radio module 230 has started transmitting (304). For example, the collocated second radio module 230 may transmit a signal to the first radio module while the collocated second radio module 230 is transmitting. If the first radio module 220 determines that the collocated second radio module 230 is not transmitting (304), the first radio module 220 continues to determine one or more link margins of one or more channels that are associated with the link (302). If the first radio module 220 determines that the collocated second radio module 230 is transmitting (304), the first radio module 220 determines one or more variations in the one or more link margins when the collocated second radio module 230 is transmitting (306). For example, the first radio module 220 may determine the link margins while receiving data over the first link when the collocated second radio module 230 is transmitting. The first radio module 220 may determine the variations in the one or more link margins by comparing the one or more link margins determined when the collocated second radio module 230 was not transmitting to the one or more link margins determined when the collocated second radio module 230 was transmitting.

The first radio module 220 determines the quality of service associated with the first link (308). In one or more implementations, the first radio module 220 may determine the quality of service associated with the first link based on a type of the first link, the types of packets being transmitted over the first link, and/or based on information received from the host controller 210. The types of the packets may be determinable from packet headers, and the type of the link may be determinable from information received, e.g. from the electronic device 130A, when the link was established.

For example, in the Bluetooth specification, synchronous connection-oriented (SCO) links and enhanced SCO (eSCO) links and/or packets are used for voice traffic, which is associated with a high quality of service due to tight latency requirements. Bluetooth sniff links are typically used for human interface device (HID) traffic, which is associated with a high quality of service, e.g. to avoid missed packets which could result unsmooth interactions with the HID. Asynchronous connection-less (ACL) links and/or packets are associated with a lower quality of service, unless used with the advanced audio distribution profile (A2DP). The A2DP is generally used for audio streaming traffic, which may be associated with a medium quality of service since the A2DP allows for several retransmissions, thereby allowing the link to tolerate occasional collisions, up to a limit. In one or more implementations, the host controller 210 may inform the first radio module 220 when an ACL link is using the A2DP.

Thus, links transmitting SCO and sniff packets may be associated with a high quality of service, along with links transmitting eSCO packets when the eSCO setting does not support retransmissions. Links transmitting ACL packets using the A2DP may be associated with a medium quality of service, along with links transmitting eSCO packets when the eSCO setting supports retransmissions. Links transmitting ACL packets, page scan packets, inquiry scan packets, page packets, inquiry packets may be associated with a low quality of service. For a Wi-Fi link, the first radio module 220 may receive information from the host controller 210 that indicates the quality of service associated with the traffic being transmitted over the Wi-Fi link. For example, voice-over-Wi-Fi or video-over-Wi-Fi traffic may be associated with a high quality of service, while web browsing traffic may be associated with a low quality of service.

The first radio module 220 generates a collocated radio tolerance indicator based at least in part on the quality of service associated with the first link or the one or more variations in the link margins of the one or more channels associated with the first link (310). In one or more implementations, the collocated radio tolerance indicator may be an index value that is mapped to an action that is recommended to be performed by the host controller 210 with respect to the second radio module 230. The actions may be ordered from less detrimental actions with respect to the second radio module 230, such as enabling a time division multiplexed (TDM) coexistence scheme between the first radio module 220 and the second radio module 230, to more detrimental actions with respect to the second radio module 230, such as performing a circuit switched fall back to a 2G/3G band. In one or more implementations, the value of the collocated radio tolerance indicator may indicate the extent to which the interference can be tolerated by the first radio module 220, e.g. lower values may indicate that the interference is tolerable and higher values may indicate that the interference is intolerable, or vice-versa. In one or more implementations, the collocated radio tolerance indicator may be set to the amount of interference (e.g. in dBm) that cannot, or can, be tolerated by the second radio module, such as based on the channel experiencing the most interference from the second radio module 230.

In one or more implementations, a collocated radio tolerance indicator with a low value, such as 1, may be mapped to a recommended action of enabling the TDM coexistence signaling between the first radio module 220 and the second radio module 230, such that the uplink and/or downlink transmissions of the first radio module 220 and the second radio module 230 are time-division multiplexed. An alternative recommended action may be moving the transmissions of the second radio module 230 to another frequency band, e.g. within the LTE band. For example, band 40 of LTE occupies 2300-2400 MHz. Thus, if interference of the second radio module 230 while transmitting on a center frequency of 2380 MHz is not tolerable by the first radio module 220, the host controller 210 can coordinate moving the transmissions of the second radio module 230 to a center frequency of 2350 MHz. The collocated radio tolerance indicator may also indicate the channel of the first radio module 220 that is experiencing the intolerable interference, and/or may indicate a recommended channel to be used by the second radio module 230 to mitigate the intolerable interference. However, the channel that is used by the second radio module 230 is determined by the base station 120, and the base station 120 may be unaware that the transmissions of the second radio module 230 are causing intolerable interference to the first radio module 220.

For example, the uplink and downlink channel used by the second radio module 230 may be the same frequency, and the base station 120 may measure a good link quality on the uplink from the second radio module 230 since the intolerable interference is being experienced by the first radio module 220 that is not in communication with the base station 120. Thus, in order to cause the base station 120 to initiate a change in the channel being used by the second radio module 230, the host controller 210 may cause the second radio module 230 to transmit a channel quality indicator (CQI) that is set to an artificially low value, thereby causing the base station 120 to infer that the link quality is poor at the wireless communication device 200 end. The second radio module 230 may also be able to provide the base station 120 with an assessment of the channel quality for sub-bands within the entire LTE band, e.g. the sub-bands within 2300-2400 MHz. Thus, the second radio module 230 may report artificially low channel qualities in order to influence the frequency band selection by the base station 120.

In one or more implementations, the second radio module 230 may initiate a connection with the base station 120 on a channel that does not cause intolerable interference to the first radio module 220. However, the base station 120 may switch back to the channel that was causing the intolerable interference, since the base station 120 is unaware of the intolerable interference. Thus, in addition to reporting an artificially low channel quality, the host controller 210 may also limit the maximum transmission power of the second radio module 230, over the channel that is causing the intolerable interference, to an artificially low value for a short duration of time, e.g. substantially lower than under normal operating conditions, such that the base station infers that the quality of the channel that is causing the intolerable interference is poor. In this manner, the base station 120 may initiate a change to a different channel, or may not switch back to the channel causing the intolerable interference after the second radio module 230 initiates a connection on another channel.

In one or more implementations, a higher collocated radio tolerance indicator, e.g. indicating that the transmissions of the second radio module 230 are rendering the first radio module 220 inoperable, may be mapped to a recommended action of lowering the maximum transmission power of the second radio module 230. An alternative recommended action may be to move the transmissions of the second radio module 230 to 2G/3G bands that are located further away from the bands utilized by the first radio module 220, and for which existing filtering on the wireless communication device 200 may be adequate to prevent any interference with the first radio module 220. For example, the host controller 210 may coordinate a circuit switched fall back with respect to the second radio module 230, which may allow a seamless transition from an LTE network to a 2G/3G network.

The first radio module 220 may provide the collocated radio tolerance indicator to the host controller 210 while the second radio module 230 is transmitting (312), e.g. when the first radio module 220 receives a signal from the second radio module 230 that indicates that the second radio module is transmitting. The host controller 210 may receive the collocated radio tolerance indicator and may determine any actions that are mapped to the collocated radio tolerance indicator, e.g. as stored in a memory that is accessible by the host controller 210. The host controller may determine whether to perform any mapped actions, and/or any other actions, with respect to the second radio module 230 based at least in part on the received collocated radio tolerance indicator.

Figure 4:
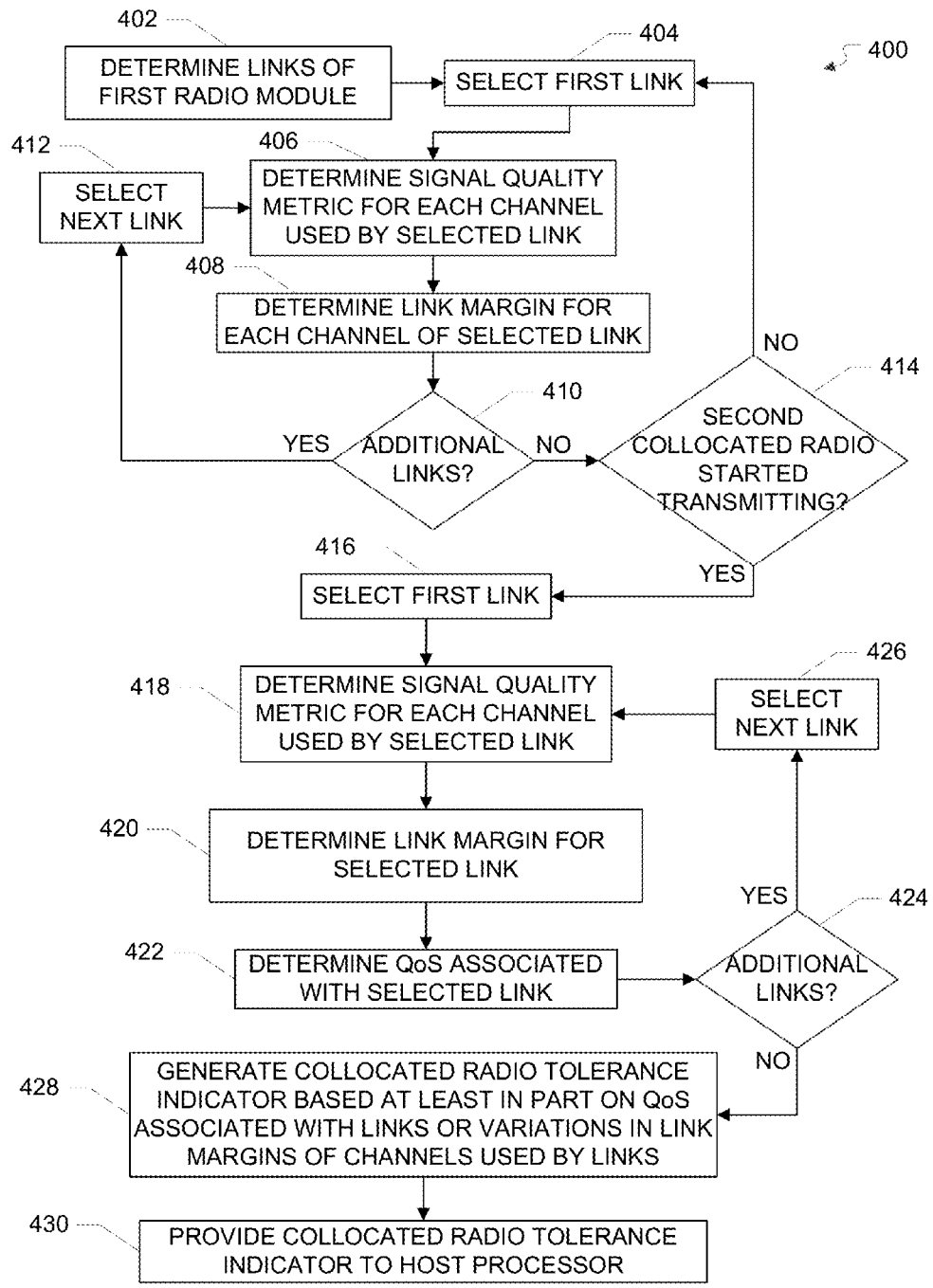
FIG. 4 illustrates a flow diagram of an example process of a radio module in a system for managing interference between collocated radios in accordance with one or more implementations.

FIG. 4 illustrates a flow diagram of an example process 400 of a radio module in a system for managing interference between collocated radios in accordance with one or more implementations. For explanatory purposes, example process 400 is described herein with reference to the first radio module 220 of the wireless communication device 200 of FIG. 2; however, example process 400 is not limited to the first radio module 220 of the wireless communication device 200 of FIG. 2, and the example process 400 may be performed by one or more components of the first radio module 220, such as an integrated processor. Further for explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

The first radio module 220 identifies the individual links that are being utilized, e.g. to communicate with the electronic devices 130A-B and/or the electronic device 140 (402). For example, the first radio module 220 may be communicating with the electronic device 130A over a first link (Bluetooth), the electronic device 130B over a second link (Bluetooth), and the electronic device 140 over a third link (Wi-Fi). The first radio module 220 selects the first link (404). The first radio module 220 determines at least one signal quality metric for each channel that is being used by the selected link (406), such as while the first radio module 220 is receiving information over the channel and while the collocated second radio module 230 is not transmitting. The at least one signal quality metric for a channel may include RSSI, PER, BER, and/or a number of retransmissions over the channel. In one or more implementations, the first radio module 220 may use multiple channels to communicate with the electronic devices 130A-B through frequency hopping, such as at least twenty channels, and the first radio module 220 may use a single channel to communicate with the electronic device 140.

The first radio module 220 determines a link margin for each channel of the selected link (408). In one or more implementations, the first radio module 220 may determine a link margin for the selected link, as a whole, as the lowest link margin of any of the channels of the selected link, or an average link margin of the channels of the selected link. The first radio module 220 determines whether there are any additional links for which the link margin has not been determined (410). If the first radio module 220 determines that there are additional links for which the link margin has not been determined (410), the first radio module 220 selects the next link (412), determines at least one signal quality metric for the one or more channels used by the selected link (406), and determines a link margin for each of the one or more channels used by the selected link (408).

If the first radio module 220 determines that there are no additional links for which the link margin has not been determined (410), the first radio module 220 determines whether the collocated second radio 230 has started transmitting (414). In one or more implementations, the first radio module 220 may receive a signal from the second radio module 230 while the second radio module 230 is transmitting. If the first radio module 220 determines that the second radio module 230 is not transmitting (414), the first radio module 220 continues to determine signal quality metrics and link margins for the channels of the links of the first radio module 220.

If the first radio module 220 determines that the second radio module 230 has started transmitting (414), the first radio module 220 selects the first link (416). The first radio module 220 determines at least one signal quality metric for each channel that is being used by the selected link (418), such as while the first radio module 220 is receiving information over the channel and while the collocated second radio module 230 is transmitting. The first radio module 220 determines a link margin for each channel of the selected link (420). In one or more implementations, the first radio module 220 may determine a link margin for the selected link, as a whole, as the lowest link margin of any of the channels of the selected link, or an average link margin of the channels of the selected link. The first radio module 220 determines the quality of service associated with the selected link (422), such as based on the types of packets being transmitted over the selected link, based on information received when the selected link was established, and/or based on information received from the host controller 210.

The first radio module 220 determines whether there are any additional links for which the link margin has not been determined while the collocated second radio module 230 is transmitting (424). If the first radio module 220 determines that there are additional links for which the link margin has not been determined while the collocated second radio module 230 is transmitting (424), the first radio module 220 selects the next link (426), determines at least one signal quality metric for the one or more channels used by the selected link (418), determines a link margin for each of the one or more channels used by the selected link (420), and determines a quality of service associated with the selected link (422).

If the first radio module 220 determines that there are no additional links for which the link margin has not been determined while the collocated second radio module 230 is transmitting (424), the first radio module 220 generates a collocated radio tolerance indicator based at least in part on the quality of service associated with the links, the link margins of the channels used by the links that were determined while the collocated second radio module 230 was transmitting, and/or the variations in the link margins of the channels used by the links while the collocated second radio module 230 was transmitting relative to when the collocated second radio module 230 was not transmitting (428). The first radio module 220 then provides the collocated radio tolerance indicator to the host controller 210 (430).

Figure 5:
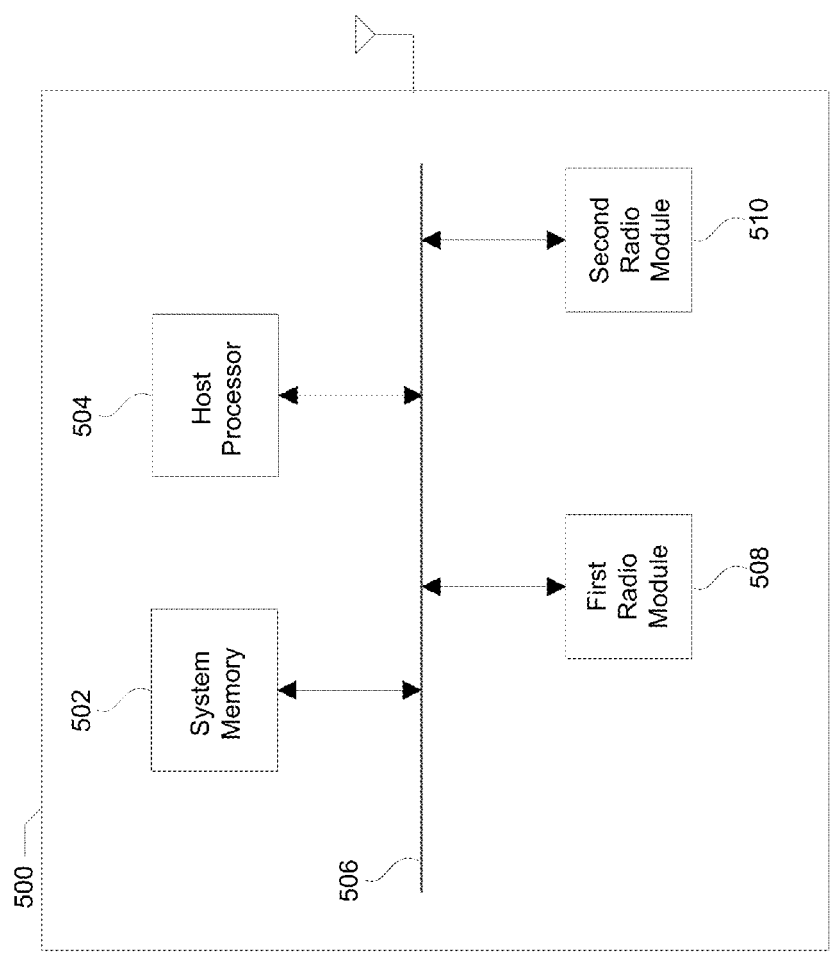
FIG. 5 conceptually illustrates an electronic system with which one or more implementations of the subject technology may be implemented.

FIG. 5 conceptually illustrates an electronic system 500 with which any implementations of the subject technology may be implemented. The electronic system 500 may be, or may be a part of, the user device 110, the base station 120, the electronic devices 130A-B, 140, and/or generally any electronic device that transmits wireless signals. The electronic system 500 includes system memory 502, one or more host processors 504, a first radio module 508, and a second radio module 510, or subsets and variations thereof. For example, the electronic system 500 may include additional radio modules. Alternatively, or in addition, the user device 110, the base station 120, or any of the electronic devices 130A-B, 140 may include one or more of the components of the electronic system 500.

The bus 506 collectively represents all system, peripheral, and chipset buses that communicatively connect the numerous internal devices of the electronic system 500. Although the bus 506 is illustrated as a single line, the bus 506 may include multiple discrete connections, such as direct connections, between one or more of the system memory 502, the one or more host processors 504, the first radio module 508, and/or the second radio module 510. In one or more implementations, the bus 506 communicatively connects the one or more host processors 504 with the system memory 502. The one or more host processors 504 can be a single processor or a multi-core processor in different implementations. Alternatively, or in addition, the one or more host processors 504 may be implemented in logic. The system memory 502 may be a read-and-write memory device. The system memory 502 may be, and/or may include, a volatile read-and-write memory, such as random access memory, or a non-volatile read-and-write memory, such as a permanent storage device. The system memory 502 stores any of the instructions and/or data that the one or more host processors 504 needs at runtime. The system memory 502 may store mappings between collocated radio tolerance indicators and recommended actions. In one or more implementations, the processes of the subject disclosure are stored in the system memory 502. From these various memory units, the one or more host processors 504 retrieves instructions to execute and data to process in order to execute the processes of one or more implementations.

The first radio module 508 and the second radio module 510 may enable the electronic system 500 to communicate wirelessly using one or more wireless standards or specifications. For example, the second radio module 510 may be a cellular radio module, such as an LTE radio module, and may enable the electronic system 500 to communicate with, e.g., the user device 110 and/or the base station 120 via cellular communications. The first radio module 508 may be a radio module for communicating using another communication specification, such as Bluetooth and/or Wi-Fi. For example, the first radio module 508 may enable the electronic system 500 to communicate with, e.g. the electronic devices 130A-B over Bluetooth and/or the electronic device 140 over Wi-Fi. In one or more implementations, the bus 506 may include a direct connection between the first radio module 508 and the second radio module 510. For example the second radio module 510 may transmit a first signal to the first radio module 508 when the second radio module 510 is actively transmitting and a second signal when the second radio module 510 is actively receiving. In one or more implementations, the first radio module 508 may similarly transmit signals to the second radio module 510 when the first radio module 508 is actively transmitting and/or receiving.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for managing interference between collocated radios, the method comprising:
   determining, by a first radio circuit, a first link quality metric of a channel associated with a first link of the first radio circuit when a collocated second radio circuit is not transmitting;
   determining, by the first radio circuit, a first link margin associated with the first link of the first radio circuit when the collocated second radio circuit is not transmitting based at least in part on the determined first link quality metric of the channel associated with the first link;
   generating, by the first radio circuit when the collocated second radio circuit is determined to be transmitting, a collocated radio tolerance indicator based at least in part on a variation in the first link margin associated with the first link, wherein the collocated radio tolerance indicator indicates a tolerance of the first radio circuit to the transmitting by the collocated second radio circuit while the first radio circuit is receiving; and
   providing, by the first radio circuit, the collocated radio tolerance indicator to a host controller when the collocated second radio circuit is determined to be transmitting, otherwise not providing the collocated radio tolerance indicator to the host controller.

2. The method of claim 1, wherein determining, by the first radio circuit, the first link margin associated with the first link of the first radio circuit when the collocated second radio circuit is not transmitting further comprises:
- determining, by the first radio circuit, a first link quality metric for each of a first plurality of channels associated with the first link; and
- determining, by the first radio circuit, the first link margin associated with the first link of the first radio circuit based at least in part on the first link quality metric of each of the plurality of channels associated with the first link.

3. The method of claim 2, wherein the plurality of channels comprise a plurality of frequencies of a frequency-hopping spread spectrum being utilized by the first radio circuit for frequency-hopping.

4. The method of claim 3, wherein generating, by the first radio circuit when the collocated second radio circuit is determined to be transmitting, the collocated radio tolerance indicator based at least in part on the variation in the first link margin associated with the first link further comprises:
- generating, by the first radio circuit when the collocated second radio circuit is determined to be transmitting, the collocated radio tolerance indicator based at least in part on the variation in the first link margin associated with the first link and a number of the plurality of frequencies of the frequency-hopping spread spectrum that are available for frequency hopping.

5. The method of claim 2, further comprising:
- determining, by the first radio circuit, a second link quality metric of each of the plurality of channels associated with the first link while the collocated second radio circuit is determined to be transmitting; and
- determining, by the first radio circuit, the variation in the first link margin associated with the first link of the first radio circuit by comparing the first link quality metric of each of the plurality of channels associated with the first link to the second link quality metric of each of the plurality of channels associated with the first link.

6. The method of claim 1, further comprising:
- determining, by the first radio circuit, a second link quality metric of the channel associated with the first link when the collocated second radio circuit is determined to be transmitting; and
- determining, by the first radio circuit, the variation in the first link margin associated with the first link of the first radio circuit by comparing the first link quality metric of the channel associated with the first link to the second link quality metric of the channel associated with the first link.

7. The method of claim 1, wherein generating, by the first radio circuit when the collocated second radio circuit is determined to be transmitting, the collocated radio tolerance indicator based at least in part on the variation in the first link margin associated with the first link comprises:
- generating, by the first radio circuit when the collocated second radio circuit is determined to be transmitting, the collocated radio tolerance indicator based at least in part on the variation in the first link margin associated with the first link and a quality of service associated with the first link.

8. The method of claim 7, further comprising:
- determining, by the first radio circuit, a second link margin associated with a second link of the first radio circuit when the collocated second radio circuit is not transmitting, wherein the collocated radio tolerance indicator is based at least in part on the quality of service associated with the first link, the variation in the first link margin associated with the first link, or a variation in the second link margin associated with the second link when the collocated second radio circuit is determined to be transmitting.

9. The method of claim 1, wherein the collocated radio tolerance indicator is mapped to one of a plurality of actions to be performed by the host controller with respect to the collocated second radio circuit, the plurality of actions comprising at least one of performing a circuit switched fall back with respect to the collocated second radio circuit, coordinating a channel change with respect to the second radio circuit, coordinating a reduction in transmission power of the collocated second radio circuit, or enabling a time division multiplexing coexistence algorithm with respect to the first radio circuit and the collocated second radio circuit.

10. The method of claim 1, wherein the collocated radio tolerance indicator indicates the tolerance of the first radio circuit to the transmitting by the collocated second radio circuit on a first frequency while the first radio circuit is receiving on a second frequency that neighbors the first frequency.

11. The method of claim 1, wherein the first radio circuit comprises a Wi-Fi radio circuit and the second radio circuit comprises a cellular radio circuit.

12. A computer program product comprising instructions stored in a non-transitory computer-readable storage medium, the instructions comprising:
- instructions to generate, by a first radio circuit, a collocated radio tolerance indicator based at least in part on a link margin associated with a first link of the first radio, wherein the collocated radio tolerance indicator indicates a tolerance of the first radio circuit to interference caused by a collocated second radio circuit when the collocated second radio circuit is transmitting and the first radio circuit is receiving;
- instructions to determine, by the first radio circuit, whether the collocated second radio circuit is transmitting; and
- instructions to provide, by the first radio circuit, the collocated radio tolerance indicator to a host controller when the collocated second radio circuit is determined to be transmitting.

13. The computer program product of claim 12, wherein the instructions to generate, by the first radio circuit, the collocated radio tolerance indicator that indicates the tolerance of the first radio circuit to the interference caused by the collocated second radio circuit when the collocated second radio circuit is transmitting further comprises:
- instructions to generate, by the first radio circuit, the collocated radio tolerance indicator that indicates the tolerance of the first radio circuit to the interference caused by the collocated second radio circuit when the collocated second radio circuit is transmitting based at least in part on a number of frequencies of a frequency-hopping spread spectrum that are available for frequency-hopping while the collocated second radio circuit is transmitting.

14. The computer program product of claim 9, wherein the instructions to generate, by the first radio circuit, the collocated radio tolerance indicator that indicates the tolerance of the first radio circuit to the interference caused by the collocated second radio circuit when the collocated second radio circuit is transmitting further comprises:
- instructions to generate, by the first radio circuit, the collocated radio tolerance indicator based at least in part on the link margin associated with the first link of the first radio circuit and a quality of service associated with the first link of the first radio circuit, wherein the collocated radio tolerance indicator indicates the tolerance of the first radio circuit to the interference caused by the collocated second radio circuit when the collocated second radio circuit is transmitting.

15. The computer program product of claim 9, wherein the instructions further comprise:
instructions to determine, by the first radio circuit, first link quality metrics of channels utilized for the first link when the collocated second radio circuit is determined to not be transmitting;
instructions to determine, by the first radio circuit, second link quality metrics of the channels utilized for the first link when the collocated second radio circuit is determined to be transmitting; and
instructions to determine, by the first radio circuit, the link margin associated with the first link of the first radio circuit based at least in part on the first link quality metrics and the second link quality metrics.

16. The computer program product of claim 9, wherein the collocated radio tolerance indicator is mapped to one of a plurality of actions to be performed by the host controller with respect to the collocated second radio circuit, the plurality of actions comprising at least one of performing a circuit switched fall back with respect to the collocated second radio circuit, coordinating a channel change with respect to the second radio circuit, coordinating a reduction in transmission power of the collocated second radio circuit, or enabling a time division multiplexing coexistence algorithm with respect to the first radio circuit and the collocated second radio circuit.

17. The computer program product of claim 12, wherein the first radio circuit comprises a Wi-Fi radio circuit and the second radio circuit comprises a cellular radio circuit.

18. A device comprising:
a first radio circuit configured to generate a collocated radio tolerance indicator based at least in part on a quality of service associated with a first link of the first radio circuit and a link margin associated with the first link of the first radio circuit, and provide the collocated radio tolerance indicator to a host processor when a second collocated radio circuit is transmitting, wherein the collocated radio tolerance indicator indicates a tolerance of the first radio circuit to interference caused by the collocated second radio circuit when the collocated second radio circuit is transmitting;
the second radio circuit; and
the host processor, wherein the host processor is configured to control the second radio circuit based at least in part on the collocated radio tolerance indicator.

19. The device of claim 18, wherein the collocated radio tolerance indicator is mapped to one of a plurality of actions that are performed by the host processor with respect to the collocated second radio circuit upon receipt of the collocated radio tolerance indicator, the plurality of actions comprising at least one of performing a circuit switched fall back with respect to the collocated second radio circuit, coordinating a channel change with respect to the second radio circuit, coordinating a reduction in transmission power of the collocated second radio circuit, or enabling a time division multiplexing coexistence algorithm with respect to the first radio circuit and the collocated second radio circuit.

20. The device of claim 18, wherein the first radio circuit comprises at least one of a Bluetooth radio circuit or a Wi-Fi radio circuit and the second radio circuit comprises a long term evolution (LTE) radio circuit.

21. The device of claim 18, wherein the collocated radio tolerance indicator indicates the tolerance of the first radio circuit to the transmitting by the collocated second radio circuit on a first frequency while the first radio circuit is receiving on a second frequency that neighbors the first frequency.

* * * * *